US012799304B2

(12) United States Patent
Machinaka et al.

(10) Patent No.: US 12,799,304 B2
(45) Date of Patent: Nov. 17, 2026

(54) INSULATED ELECTRIC WIRE AND CABLE FOR INFORMATION TRANSMISSION

(71) Applicant: SUMITOMO ELECTRIC INDUSTRIES, LTD., Osaka (JP)

(72) Inventors: Syota Machinaka, Osaka (JP); Shigeyuki Tanaka, Osaka (JP); Taro Fujita, Osaka (JP); Satoshi Okano, Tochigi (JP); Yuji Ochi, Tochigi (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 473 days.

(21) Appl. No.: 18/038,006

(22) PCT Filed: Nov. 19, 2021

(86) PCT No.: PCT/JP2021/042575
§ 371 (c)(1),
(2) Date: May 20, 2023

(87) PCT Pub. No.: WO2022/113900
PCT Pub. Date: Jun. 2, 2022

(65) Prior Publication Data

US 2024/0002636 A1 Jan. 4, 2024

(30) Foreign Application Priority Data

Nov. 24, 2020 (JP) ................................ 2020-194761

(51) Int. Cl.
*C08K 5/47* (2006.01)
*C08K 5/134* (2006.01)
*C08K 5/25* (2006.01)
*H01B 3/44* (2006.01)
*H01B 11/00* (2006.01)

(52) U.S. Cl.
CPC ................ *C08K 5/47* (2013.01); *C08K 5/134* (2013.01); *C08K 5/25* (2013.01); *H01B 3/441* (2013.01); *H01B 11/00* (2013.01)

(58) Field of Classification Search
CPC . C08K 5/47; C08K 5/134; C08K 5/25; C08K 5/13; C08K 5/372; H01B 3/441; H01B 11/00; H01B 11/1091; H01B 3/44; Y02A 30/00; C08L 23/10; C08L 23/00
USPC .............. 428/373; 174/110 R, 120 R, 121 A, 174/121 SR, 120 SR, 110 SR
See application file for complete search history.

(56) References Cited

U.S. PATENT DOCUMENTS

2009/0301756 A1* 12/2009 Hase ........................ H01B 3/30 174/120 SR

FOREIGN PATENT DOCUMENTS

JP 2008-266434 A 11/2008
JP 2009-081132 A 4/2009
(Continued)

*Primary Examiner* — Matthew D Matzek
(74) *Attorney, Agent, or Firm* — Renner, Otto, Boisselle & Sklar, LLP

(57) ABSTRACT

An insulated electric wire according to one aspect includes at least one linear conductor, and at least one insulating layer layered on the outer peripheral surface of the conductor, wherein the insulating layer contains an olefinic resin and an antioxidant, the content of the antioxidant is more than 1.0 part by mass and 5.0 parts by mass or less per 100 parts by mass of the olefinic resin, and the antioxidant comprises a phenolic antioxidant and a sulfur-based antioxidant except for a sulfur-containing phenolic antioxidant.

5 Claims, 2 Drawing Sheets

(56) References Cited

FOREIGN PATENT DOCUMENTS

| | | | | |
|---|---|---|---|---|
| JP | 2012-97217 | A | | 5/2012 |
| JP | 2012097217 | A | * | 5/2012 |
| JP | 4951704 | B1 | * | 6/2012 |
| JP | 2016105406 | A | * | 6/2016 |

* cited by examiner

INSULATED ELECTRIC WIRE AND CABLE FOR INFORMATION TRANSMISSION

TECHNICAL FIELD

The present disclosure relates to an insulated electric wire and a cable for information transmission. This application claims priority based on Japanese Patent Application No. 2020-194761, which is a Japanese patent application filed on Nov. 24, 2020. The entire contents described in the Japanese patent application are incorporated herein by reference.

BACKGROUND ART

In association with needs for automatic driving technology and driving assist functions for automobiles, in-vehicle information electric wires are required to further enhance the capacity and speed of information transmission. Transmission losses have a positive correlation with the frequency of a signal and the dielectric dissipation factor of an insulating layer of a signal transmission cable. Thus, for speed-up of signal transmission, it is required to reduce the dielectric dissipation factor of the insulating layer and further reduce the transmission losses to stably transmit signals.

In conventional arts, there is disclosed a communication cable having a low dielectric loss of the insulator layer in a high frequency band and having a long life even when being used in a high temperature environment, in which cable an electrically insulating material containing a phenolic antioxidant that does not have a hindered phenol structure is used for the insulator layer (see Japanese Patent Laying-Open No. 2009-81132).

CITATION LIST

Patent Literature

PTL 1: Japanese Patent Laying-Open No. 2009-81132

SUMMARY OF INVENTION

An insulated electric wire according to one aspect of the present disclosure comprises at least one linear conductor, and at least one insulating layer layered on the outer peripheral surface of the conductor, wherein the insulating layer contains an olefinic resin and an antioxidant, the content of the antioxidant is more than 1.0 part by mass and 5.0 parts by mass or less per 100 parts by mass of the olefinic resin, and the antioxidant comprises a phenolic antioxidant and a sulfur-based antioxidant except for a sulfur-containing phenolic antioxidant.

DETAILED DESCRIPTION

Figure 1:
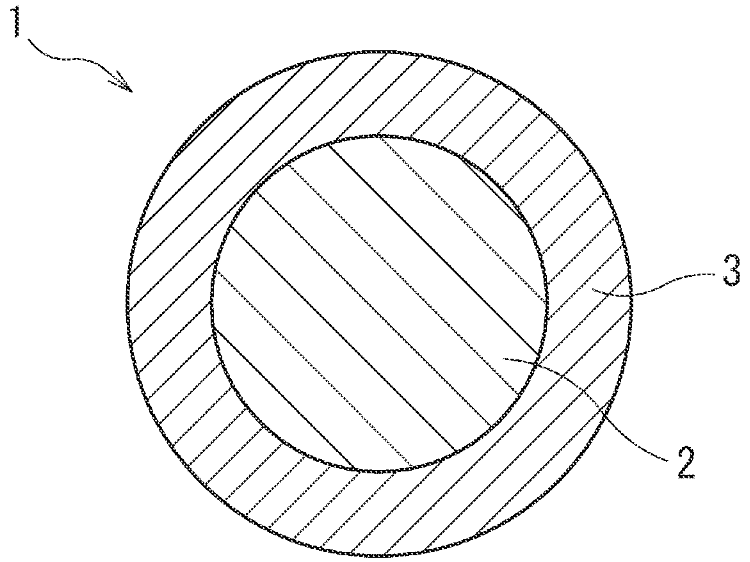
FIG. 1 is a schematic transverse cross-sectional view of an insulated electric wire according to an embodiment of the present invention.

Problem to be Solved by the Present Disclosure

In the conventional arts described above, if an insulating layer contains an additive such as an antioxidant, the dielectric dissipation factor may become larger. In the in-vehicle information electric wires described above, as transmission lines, the influence of the dielectric dissipation factor is larger on the signal attenuation. Meanwhile, for insulating materials for use in in-vehicle information electric wires and the like, it is desired to improve the heat resistance while electric characteristics are maintained.

The present disclosure has been made under such circumstances, and has an object to provide an insulated electric wire that suppresses an increase in the dielectric dissipation factor of an insulating layer as well as is excellent in heat resistance.

Advantageous Effect of the Present Disclosure

According to the present disclosure, it is possible to provide an insulated electric wire that suppresses an increase in the dielectric dissipation factor of an insulating layer as well as is excellent in heat resistance.

DESCRIPTION OF EMBODIMENTS

First, aspects of the present invention will be described by listing.

An insulated electric wire according to one aspect of the present disclosure comprises at least one linear conductor, and at least one insulating layer layered on the outer peripheral surface of the conductor, wherein the insulating layer contains an olefinic resin and an antioxidant, the content of the antioxidant is more than 1.0 part by mass and 5.0 parts by mass or less per 100 parts by mass of the olefinic resin, and the antioxidant comprises a phenolic antioxidant and a sulfur-based antioxidant except for a sulfur-containing phenolic antioxidant.

As the insulating layer contains an olefinic resin having a low polarity, the insulated electric wire enables the dielectric dissipation factor to be satisfactorily reduced. The insulating layer contains an antioxidant comprising a phenolic antioxidant and a sulfur-based antioxidant except for a sulfur-containing phenolic antioxidant, and the content of the antioxidant is in the range described above. Thus, the heat resistance of the insulating layer, which is the durability under a high-temperature environment, can be improved while thermal deterioration of the olefinic resin and an increase in the dielectric dissipation factor are suppressed. Accordingly, the insulated electric wire suppresses an increase in the dielectric dissipation factor of the insulating layer as well as is excellent in heat resistance.

The mass ratio of the phenolic antioxidant to the sulfur-based antioxidant may be from 4:1 to 1:4. With the mass ratio of the phenolic antioxidant to the sulfur-based antioxidant being in the above range, the heat resistance can be further improved.

The phenolic antioxidant may have a semi-hindered phenol structure represented by the following formula (1) or a less-hindered phenol structure represented by the following formula (2).

[Formula 1]

(1)

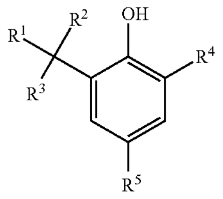

(2)

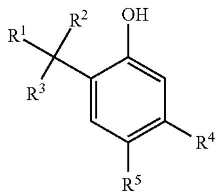

In the formulas (1) and (2), $R^1$ to $R^4$ are methyl groups. $R^5$ is a substituent.

With the phenolic antioxidant having a semi-hindered phenol structure represented by the above formula (1) or a less-hindered phenol structure represented by the above formula (2), the effect of reducing the dielectric dissipation factor of the insulating layer and the heat resistance can be more improved.

The sulfur-based antioxidant may be one represented by the following formula (3) or the following formula (4).

[Formula 2]

(3)

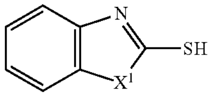

(4)

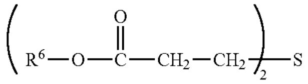

In the formulas (3) and (4), $X^1$ is —S— or —NH—, and $R^6$ is an alkyl group.

With the insulated electric wire containing a sulfur-based antioxidant represented by the above formula (3) or the above formula (4), the heat resistance can be further improved.

The olefinic resin may be polypropylene. With the olefinic resin being polypropylene, the effect of reducing the dielectric dissipation factor of the insulating layer can be further improved.

The insulating layer may further contain a metal deactivator. With the insulating layer further containing a metal deactivator, deterioration by metal can be suppressed, and thus oxidative deterioration of the olefinic resin can be suppressed. Accordingly, the dielectric dissipation factor of the insulating layer can be further reduced. The term "deterioration by metal" here generally refers to acceleration of oxidative deterioration in a material due to the catalytic action of a metal to be in contact with the material.

The dielectric dissipation factor of the insulating layer in the case of application of a high frequency electric field having a frequency of 10 GHz may be $4.2\times10^{-4}$ or less. With the dielectric dissipation factor of the insulating layer in the case of application of a high frequency electric field having a frequency of 10 GHz being in the above range, the effect of reducing the transmission losses can be sufficiently improved.

Another aspect of the present disclosure is a cable for information transmission comprising one or more of the insulated electric wires.

As the cable for information transmission comprises the insulated electric wire, an increase in the dielectric dissipation factor of the insulating layer can be suppressed and excellent heat resistance can be achieved. Accordingly, the cable for information transmission enables the durability under a high temperature environment to be improved and transmission losses to be reduced.

DETAILS OF EMBODIMENT OF THE PRESENT DISCLOSURE

Hereinafter, the insulated electric wire and the cable for information transmission according to embodiments of the present disclosure will be described in detail with reference to the drawings as appropriate.

<Insulated Electric Wire>

The insulated electric wire comprises at least one linear conductor, and at least one insulating layer layered on the outer peripheral surface of the conductor. FIG. 1 is a schematic transverse cross-sectional view of an insulated electric wire according to an embodiment of the present disclosure. As shown in FIG. 1, an insulated electric wire 1 comprises a linear conductor 2 and a single insulating layer 3 layered on the outer peripheral surface of this conductor 2.

[Conductor]

Conductor 2 is a round wire having a circular cross-sectional shape, for example, but may be a square wire having a square cross-sectional shape, a rectangular wire having a rectangular cross-sectional shape, or a stranded wire obtained by twisting a plurality of element wires.

The material of conductor 2 is preferably a metal having a high electrical conductivity and a high mechanical strength. Examples of such a metal include copper, a copper alloy, aluminum, an aluminum alloy, nickel, silver, soft iron, steel, and stainless steel. For conductor 2, it is possible to use a material obtained by forming such a metal into a linear form or a multi-layered structure in which other metals are coated on such a linear material, for example, a nickel-coated copper wire, a silver-coated copper wire, a copper-coated aluminum wire, or a copper-coated steel wire.

The lower limit of the average cross-sectional area of conductor 2 is preferably 0.01 $mm^2$ and more preferably 0.1 $mm^2$. Meanwhile, the upper limit of the average cross-sectional area of conductor 2 is preferably 10 $mm^2$ and more preferably 5 $mm^2$. When the average cross-sectional area of conductor 2 is less than 0.01 $mm^2$, the volume of insulating layer 3 may increase, and the volume efficiency of a coil or the like formed by using the insulated electric wire may become low. Conversely, when the average cross-sectional area of conductor 2 exceeds 10 $mm^2$, insulating layer 3 has to be formed thicker in order to sufficiently reduce the permittivity, and the insulated electric wire may be unnecessarily large in diameter. The "average cross-sectional area" of a conductor means an average value obtained by measuring the cross-sectional area of 10 conductors at any desired portions.

[Insulating Layer]

Insulating layer 3 is formed on the outer peripheral surface of conductor 2.

Insulating layer 3 above contains an olefinic resin and an antioxidant.

Insulating layer 3 enables the dielectric dissipation factor to be satisfactorily reduced by containing an olefinic resin having a low polarity. Examples of the olefinic resin that can be used include polypropylene, polypropylene-based thermoplastic elastomer, a reactor-type polypropylene-based thermoplastic elastomer, a dynamic crosslinked polypropylene-based thermoplastic elastomer, polyethylene (high-density polyethylene (HDPE), linear low-density polyethylene (LLDPE), low-density polyethylene (LDPE), very low-density polyethylene (VLDPE)), polyethylene-based resins such as an ethylene-propylene copolymer, polymethylpentene, an ethylene-vinyl acetate copolymer, an ethylene-ethyl acrylate copolymer, an ethylene-methyl methacrylate copolymer, an ethylene-methyl acrylate copolymer, an ethylene-ethyl methacrylate copolymer, an ethylene-butyl acrylate copolymer, ethylene-propylene rubber, ethylene-acrylate rubber, an ethylene-glycidyl methacrylate copolymer, and an ethylene-methacrylic acid copolymer, and an ionomer resin in which the molecules of an ethylene-methacrylic acid copolymer or an ethylene-acrylic acid copolymer are intermolecularly coupled with metal ions such as sodium or zinc. Examples also include one obtained by modifying such a resin with maleic anhydride or the like or one having an epoxy group, an amino group, or an imide group. "High-density polyethylene (HDPE)" refers to polyethylene having a density of 0.942 $g/cm^3$ or more. "Linear low-density polyethylene (LLDPE)" refers to polyethylene having a density of 0.910 $g/cm^3$ or more and less than 0.930 $g/cm^3$ that is obtained by copolymerizing ethylene and α-olefin. "Low-density polyethylene (LDPE)" refers to polyethylene having a density of 0.910 $g/cm^3$ or more and less than 0.930 $g/cm^3$ that is obtained by polymerizing ethylene by a high-pressure polymerization method. "Very-low density polyethylene (VLDPE)" refers to polyethylene having a density of 0.870 $g/cm^3$ or more and less than 0.910 $g/cm^3$. Examples of "polymethylpentene" include a homopolymer of 4-methyl-1-pentene and a copolymer of 4-methyl-1-pentene with 3-methyl-1-pentene or another α-olefin. Examples of the α-olefin include propylene, butene, pentene, hexene, heptene, octene, vinyl acetate, methyl acrylate, ethyl acrylate, methyl methacrylate, and ethyl methacrylate.

As the olefinic resin, of these, polypropylene is preferable, and polypropylene having a melting point of 140° C. or more is more preferable. Examples of polypropylene include homopolypropylene, random polypropylene, and block polypropylene. Homopolypropylene is a homopolymer of propylene. Examples of random polypropylene include a copolymer of propylene and ethylene or α-olefin having 4 to 20 carbon atoms. Block polypropylene is a resin comprising homopolypropylene as the main component, a random copolymer elastomer as a copolymer component, and an ethylene polymer as an optional component. Of these, block polypropylene or homopolypropylene is more preferable in terms of mechanical strength. With the olefinic resin being such polypropylene, the effect of reducing the dielectric dissipation factor of the insulating layer and the heat resistance can be more improved. The "main component" means a component of which the content is the highest.

The lower limit of the content of the olefinic resin in insulating layer 3 is preferably 95.0% by mass and more preferably 98.0% by mass. When the content of the olefinic resin is less than 95.0% by mass, it may be difficult to satisfactorily reduce the dielectric dissipation factor of the insulating layer. Meanwhile, the upper limit of the content of the olefinic resin is preferably 99.9% by mass and more preferably 99.5% by mass. When the content of the olefinic resin exceeds 99.9% by mass, the content of the antioxidant and the like in the insulating layer becomes insufficient, and thus the effect of improving the heat resistance in the insulating layer may not become sufficiently high.

Insulating layer 3 may contain a resin other than the olefinic resins. For example, polytetrafluoroethylene, an acrylic resin, or fluorine rubber in the range of 0.1% by mass or more and 5.0% by mass or less may be added as a processability improver.

(Antioxidant)

An antioxidant prevents oxidation of insulating layer 3. The antioxidant comprises a phenolic antioxidant and a sulfur-based antioxidant except for a sulfur-containing phenolic antioxidant. Although the insulated electric wire contains an olefinic resin prone to oxidative deterioration, the antioxidant enables the heat resistance of insulating layer 3 to be further improved because of comprising a phenolic antioxidant and a sulfur-based antioxidant except for a sulfur-containing phenolic antioxidant.

The mass ratio of the phenolic antioxidant to the sulfur-based antioxidant is preferably from 4:1 to 1:4. With the mass ratio of the phenolic antioxidant to the sulfur-based antioxidant in the above range, the heat resistance can be further improved.

The phenolic antioxidant preferably has a semi-hindered phenol structure represented by the following formula (1) or a less-hindered phenol structure represented by the following formula (2). With the phenolic antioxidant having a semi-hindered phenol structure represented by the following formula (1) or a less-hindered phenol structure represented by the following formula (2), the effect of reducing the dielectric dissipation factor of the insulating layer and the heat resistance can be further improved.

[Formula 3]

(1)

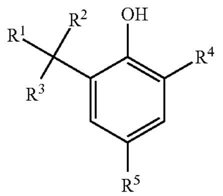

(2)

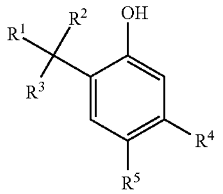

In the above formulas (1) and (2), $R^1$ to $R^4$ are methyl groups. $R^5$ is a substituent.

Specific examples of the antioxidant having a semi-hindered phenol structure include 3,9-bis[2-{3-(3-tert-butyl-4-hydroxy-5-methylphenyl)propionyloxy}-1,1-dimethylethyl]-2,4,8,10-tetraoxaspiro[5,5]undecane (e.g., SUMILIZER GA-80 manufactured by Sumitomo Chemical Company, Limited and ADEKASTAB AO-80 manufactured by ADEKA Corporation), ethylene bis(oxyethylene)bis[3-(5-tert-butyl-hydroxy-m-tolyl)propionate] (e.g., Irganox 245 manufactured by BASF Japan Ltd.), and triethylene glycol bis[3-(3-tert-butyl-4-hydroxy-5-methylphenyl)propionate] (e.g., ADEKASTAB AO-70 manufactured by ADEKA Corporation).

Specific examples of the antioxidant having a less-hindered phenol structure include 4,4'-thiobis(6-tert-butyl-m-cresol) (e.g., SUMILIZER WX-R manufactured by Sumitomo Chemical Company. Limited), 4,4'-butylidenebis(3-methyl-6-tert-butylphenol) (e.g., NOCRAC NS-30 manufactured by Ouchi Shinko Chemical Industrial Co., Ltd. and ADEKASTAB AO-40 manufactured by ADEKA Corporation), 4,4'-thiobis(3-methyl-6-tert-butyl)phenol (e.g., NOCRAC 300 manufactured by Ouchi Shinko Chemical Industrial Co., Ltd.), 1,1,3-tris-(2-methyl-4-hydroxy-5-tert-butylphenyl)butane (e.g., ADEKASTAB AO-30 manufactured by ADEKA Corporation), and ethylene bis[3,3-bis(3-tert-butyl-4-hydroxyphenyl)butyrate] (e.g., HOSTANOX O3 manufactured by Clariant Chemicals Ltd.).

The above sulfur-based antioxidant is preferably represented by the following formula (3) or the following formula (4). With the insulated electric wire containing a sulfur-based antioxidant represented by the following formula (3) or the following formula (4), the heat resistance can be further improved.

[Formula 4]

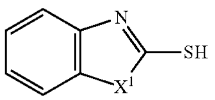

(3)

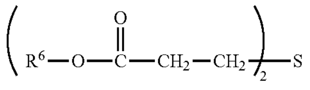

(4)

In the above formulas (3) and (4), $X^1$ is —S— or —NH—, and $R^6$ is an alkyl group.

Examples of the sulfur-based antioxidant represented by the above formula (3) include 2-mercaptobenzothiazole (e.g., SANCELER M manufactured by SANSHIN CHEMICAL INDUSTRY CO., LTD.) and 2-mercaptobenzimidazole (e.g., SUMILIZER MB manufactured by Sumitomo Chemical Company, Limited).

Examples of the sulfur-based antioxidant represented by the above formula (4) include distearyl thiodipropionate (Irganox PS802FL manufactured by BASF SE), pentaerythritol tetrakis-(3-dodecylthiopropionate) (SEENOX 412s manufactured by SHIPRO KASEI KAISHA, LTD.), didodecyl thiodipropionate (SEENOX DL manufactured by SHIPRO KASEI KAISHA, LTD.), ditetradecyl thiodipropionate (SEENOX DM manufactured by SHIPRO KASEI KAISHA, LTD.), and dioctadecyl thiodipropionate (SEENOX DS manufactured by SHIPRO KASEI KAISHA, LTD.).

As the sulfur-based antioxidant, of these, 2-mercaptobenzothiazole and pentaerythritol tetrakis-(3-dodecylthiopropionate) are preferable from the viewpoint of further improving the effect of reducing the dielectric dissipation factor of the insulating layer and the heat resistance.

The lower limit of the content of the antioxidant in the insulating layer is more than 1.0 part by mass, preferably 2.0 parts by mass, and more preferably 4.0 parts by mass per 100 parts by mass of the olefinic resin. When the content of the antioxidant is 1.0 part by mass or less, it may be difficult to improve the effect of suppressing thermal deterioration of the olefinic resin and an increase in the dielectric dissipation factor. Meanwhile, the upper limit of the content of the antioxidant is 5.0 parts by mass, preferably 4.9 parts by mass, and more preferably 4.8 parts by mass per 100 parts by mass of the olefinic resin. When the content of the antioxidant exceeds 5.0 parts by mass, the effect of suppressing an increase in the dielectric dissipation factor lowers, and the electric characteristics of the insulated electric wire may be impaired.

(Metal Deactivator)

The insulating layer preferably further contains a metal deactivator. A metal deactivator stabilizes metal ions by chelation and suppresses deterioration of a covering resin caused by metal ions, that is, deterioration by metal. With the insulating layer further containing a metal deactivator, deterioration by metal can be suppressed, and thus oxidative deterioration of the olefinic resin can be suppressed. Accordingly, the dielectric dissipation factor of the insulating layer can be further reduced. The metal deactivator in the present embodiment is preferably a copper deactivator.

The lower limit of the melting point of the metal deactivator is 200° C. and more preferably 220° C. With the lower limit of the melting point of the metal deactivator being 200° C., the effect of reducing the dielectric dissipation factor of the insulating layer and the effect of suppressing deterioration by metal can be satisfactory.

Examples of the metal deactivator include, but are not particularly limited to, a salicylic acid derivative, a phthalic acid derivative, a composite of a triazole-based compound, and an aromatic secondary amine-based compound. Examples of the salicylic acid derivative include N,N'-bis[3-(3, 5-di-t-butyl-4-hydroxyphenyl)propionyl]hydrazine (product name: Irganox MD1024, melting point: 60° C. to 67° C.), 3-(N-salicyloyl)amino-1,2,4-triazole (product name: ADEKASTAB CDA-1, melting point: 315° C. to 325° C.), and decamethylenedicarboxylic acid disalicyloylhydrazide (product name: ADEKASTAB CDA-6, melting point: 209° C. to 215° C.). Examples of the phthalic acid derivative include isophthalic acid bis(2-phenoxypropionylhydrazide) (product name: CUNOX, melting point: 225° C.). Examples of the composite of a triazole-based compound include a composite including 2-hydroxy-N-1H-1,2,4-triazol-3-yl benzamide as the main component (product name: ADEKASTAB CDA-1M, melting point: 214° C. or more). Examples of the aromatic secondary amine-based compound include N,N'-di-2-naphthyl-p-phenylenediamine (product name: NOCRAC White, melting point: 225° C. or more).

Of these, from the viewpoint of further improving the effect of suppressing deterioration by metal, a salicylic acid derivative, a phthalic acid derivative, or a combination thereof is preferable, and 3-(N-salicyloyl)amino-1,2,4-triazole and isophthalic acid bis(2-phenoxypropionylhydrazide) are more preferable. Also, one or two or more of the metal deactivators can be used.

The lower limit of the content of the metal deactivator is preferably 0.05 parts by mass, more preferably 0.2 parts by mass, and further preferably 0.5 parts by mass per 100 parts by mass of the olefinic resin. If the proportion by mass of the metal deactivator is less than 0.05 parts by mass, it may be difficult to improve the effect of suppressing deterioration by metal. Meanwhile, the upper limit of the proportion by mass of the metal deactivator is preferably 2.0 parts by mass and more preferably 1.0 part by mass. If the proportion by mass of the metal deactivator exceeds 2.0 parts by mass, an additive in the insulating layer may precipitate and crystallize from the resin onto the surface, resulting in so-called bloom, which may impair the quality of the insulating layer.

(Other Components)

In addition to the olefinic resin and the antioxidant, the insulating layer may contain other components such as a flame retardant, a flame retardant aid, a pigment, and an antioxidant.

The flame retardant imparts a flame retardancy to the insulating layer. Examples of the flame retardant include halogen-based flame retardants such as chlorine-based flame retardants and bromine-based flame retardants.

A flame retardant aid more enhances the flame retardancy of the insulating layer. Examples of the flame retardant aid include antimony trioxide.

A pigment colors the insulating layer. As the pigment, various pigments known can be used, including, for example, titanium oxide.

The upper limit of the dielectric dissipation factor of the insulating layer in the case of application of a high frequency electric field having a frequency of 10 GHz is preferably $4.2\times10^{-4}$, more preferably $3.0\times10^{-4}$, and further preferably $2.0\times10^{-4}$. With the dielectric dissipation factor of the insulating layer being $4.2\times10^{-4}$ or less, the effect of reducing the transmission losses can be sufficiently improved.

The upper limit of the relative permittivity of the insulating layer is preferably 2.5 and more preferably 2.3. When the relative permittivity exceeds 2.5, it may be impossible to sufficiently reduce transmission losses, and additionally it may be impossible to obtain a sufficient transmission rate.

The "dielectric dissipation factor" and "relative permittivity" are values each obtained by measurement in accordance with a method according to JIS-R1641 (2007).

The lower limit of the average thickness of insulating layer 3 is preferably 50 μm and more preferably 100 μm. Meanwhile, the upper limit of the average thickness of insulating layer 3 is preferably 1500 μm and more preferably 1000 μm. When the average thickness of insulating layer 3 is less than 50 μm, the insulation property may decrease. Conversely, when the average thickness of insulating layer 3 exceeds 1500 μm, the volume efficiency of a cable or the like formed by using the insulated electric wire may become low. The "average thickness" of the insulating layer means an average value obtained by measuring the thickness of the insulating layer at any 10 points.

[Method for Manufacturing Insulated Electric Wire]

Next, a method for manufacturing the insulated electric wire will be described. Insulating layer 3 of the insulated electric wire is formed by extrusion molding. This method for manufacturing the insulated electric wire comprises a step of extrusion-covering the outer peripheral surface of conductor 2 with a resin composition for forming an insulating layer (extrusion step). The configuration of the resin composition for forming an insulating layer is the same as that of the insulating layer described above, and thus the description therefor is omitted.

<Advantage>

The insulated electric wire suppresses an increase in the dielectric dissipation factor of the insulating layer as well as is excellent in heat resistance.

<Cable for Information Transmission>

The cable for information transmission comprises one or more of the insulated electric wires. Examples of the cable for information transmission include a cable for differential transmission and a coaxial cable.

[Cable for Differential Transmission]

A cable for differential transmission is suitably used, as a cable for transmitting differential signals, in a field in which high speed communication is required. Examples of the cable for differential transmission include a Twinax cable, which has a Twinax structure.

Figure 2:
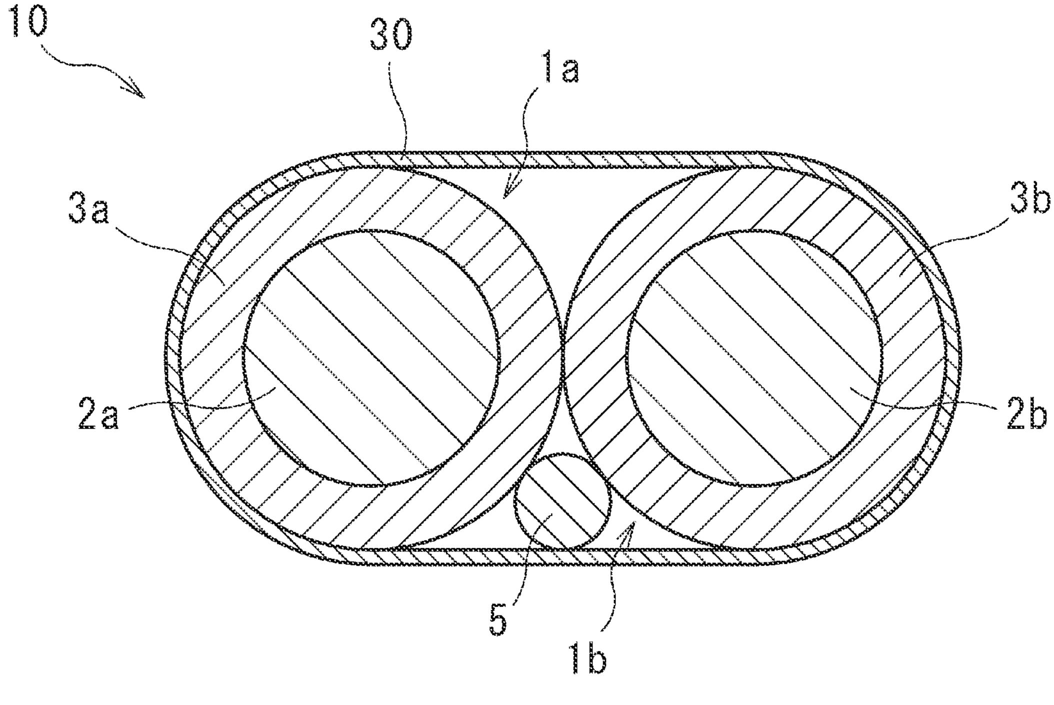
FIG. 2 is a schematic transverse cross-sectional view of a Twinax cable according to an embodiment of the present invention.

FIG. 2 is a schematic transverse cross-sectional view of a Twinax cable, which is an embodiment of the cable for information transmission. As shown in FIG. 2, a Twinax cable 10 comprises, per cable, a Twinax structure having a pair of insulated electric wires including a first insulated electric wire 1*a* and a second insulated electric wire 1*b*. First insulated electric wire 1*a* comprises a linear conductor 2*a* and a single insulating layer 3*a* layered on the outer peripheral surface of this conductor 2*a*. Second insulated electric wire 1*b* comprises a linear conductor 2*b* and a single insulating layer 3*b* layered on the outer peripheral surface of this conductor 2*b*. For first insulated electric wire 1*a* and second insulated electric wire 1*b*, the insulated electric wire is used. Twinax cable 10 comprises a drain wire 5 as a third conductor and shield tape 30 arranged so as to cover insulated electric wire 1*a*, insulated electric wire 1*b*, and drain wire 5.

When a Twinax cable is used as the cable for information transmission, signal transmission can be more efficiently performed with high accuracy and high speed. When drain wire 5 is grounded, charging in Twinax cable 10 can be prevented. Further, as shield tape 30 is included, interference of electromagnetic noise from outside can be prevented and mutual interference between the signal lines of the signal line pairs can be reduced.

Shield tape 30 is tape in which a conductive layer is provided on one side of an insulating film made of a resin such as a polyvinyl chloride resin or a flame-retardant polyolefin resin. As shield tape 30, a tape-like material such as copper-vapor-deposited PET tape can be used. As shield tape 30 is included, interference of electromagnetic noise from outside can be prevented and mutual interference between the signal lines of the signal line pairs can be reduced. In the present embodiment, shield tape 30 is arranged so as to cover the outer peripheral side of insulating layers 3*a* and 3*b*. Shield tape 30 arranged on the outer peripheral sides of first insulating layer 3*a* and second insulating layer 3*b* so as to fix the positional relationship between first insulated electric wire 1*a* and second insulated electric wire 1*b* relative to each other while wrapping first insulated electric wire 1*a*, second insulated electric wire 1*b*, and drain wire 5.

[Method for Manufacturing Twinax Cable]

In a method of manufacturing a Twinax cable, which is an embodiment of the cable for information transmission, for example, a first insulated electric wire and a second insulated electric wire are bundled, a drain wire as a third conductor is placed, and shield tape is wound around the outer periphery, and thereby a Twinax cable is manufactured.

[Coaxial Cable]

A coaxial cable, which is an embodiment of the cable for information transmission, comprises the insulated electric wire described above, an outer conductor that covers the peripheral surface of the insulated electric wire, and a jacket layer that covers the peripheral surface of the outer conductor, wherein the insulated electric wire includes one conductor as described above and one insulating layer as described above that covers the peripheral surface of this conductor. An embodiment of the coaxial cable will be described with reference to FIG. 3 and FIG. 4.

Figure 3:
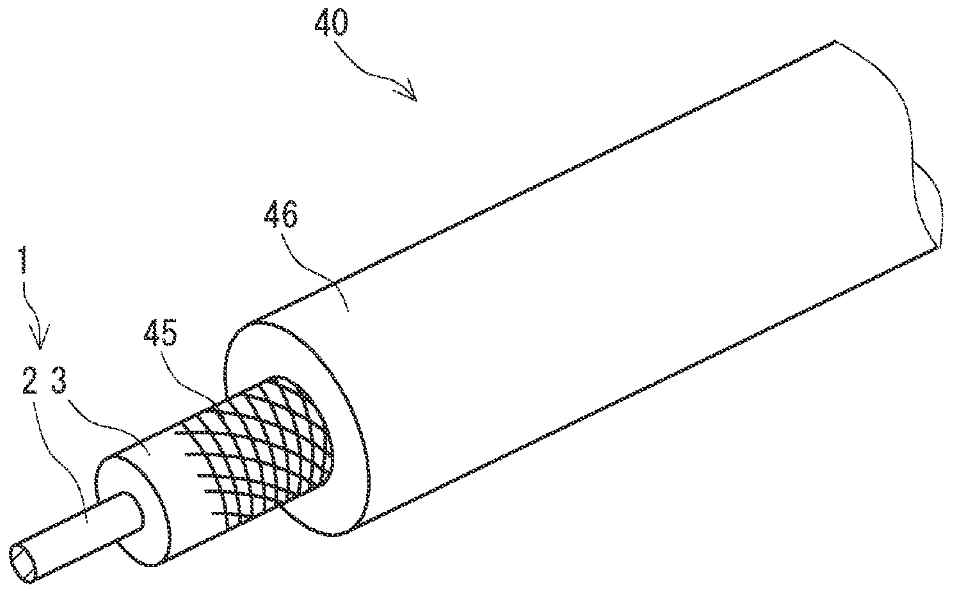
FIG. 3 is a schematic perspective view of a coaxial cable according to an embodiment of the present invention.
Figure 4:
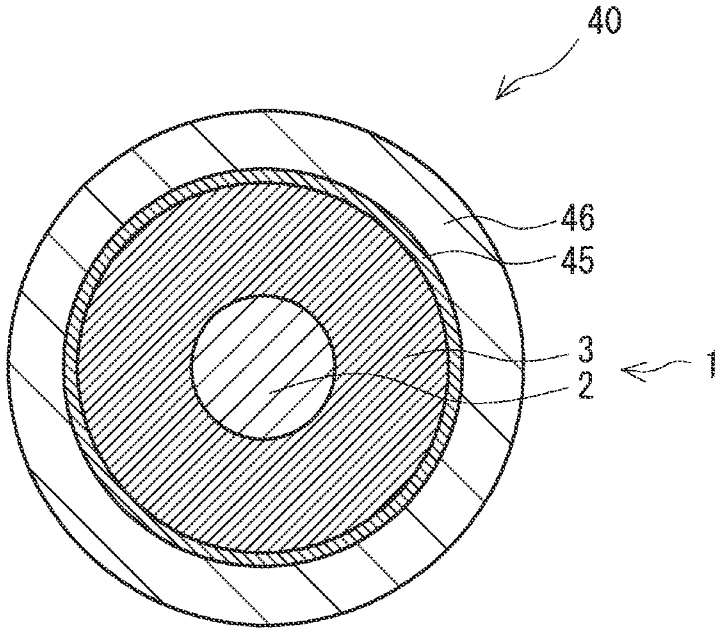
FIG. 4 is a schematic transverse cross-sectional view of the coaxial cable of FIG. 3.

A coaxial cable 40 in FIG. 3 and FIG. 4 comprises an insulated electric wire 1 including a conductor 2 and an insulating layer 3 that covers the peripheral surface of the conductor 2, an outer conductor 45 that covers the peripheral surface of the insulated electric wire 1, and a jacket layer 46 that covers the peripheral surface of the outer conductor 45. That is, the coaxial cable 40 has a configuration in which conductor 2, insulating layer 3, outer conductor 45, and jacket layer 46 are concentrically layered in the cross-sectional shape. As the cable for information transmission is coaxial cable 40, it is possible to reduce the diameter. Insulated electric wire 1, conductor 2, and insulating layer 3 are similar to those of the insulated electric wire 1 in FIG. 1. Thus, the same reference numerals are given thereto, and the description is omitted.

Outer conductor 45 serves as an earth to function as a shield for preventing electrical interference from other circuits. This outer conductor 45 covers the outer surface of insulating layer 3. Examples of outer conductor 45 include a braided shield, a served shield, a tape shield, a conductive plastic shield, and a metal tube shield. Of these, a braided shield and a tape shield are preferable from the viewpoint of a high-frequency shielding property. In a case in which a braided shield or a metal tube shield is used as outer conductor 45, the number of shields may be determined as appropriate in accordance with the shields to be used or the intended shielding property. A single shield or multiple shields, such as double shields or triple shields may be acceptable.

Jacket layer 46 protects conductor 2 and outer conductor 45 and imparts functions such as flame retardancy and weather resistance in addition to insulation. This jacket layer 46 may include a thermoplastic resin as the main component.

Examples of the above thermoplastic resin include polyvinyl chloride, low-density polyethylene, high-density polyethylene, expanded polyethylene, a polyolefin such as polypropylene, polyurethane, and a fluororesin. Of these, polyolefin and polyvinyl chloride are preferable from the viewpoint of cost and ease of processing. The above materials exemplified may be used singly or in combination of two or more thereof, and may be selected as appropriate depending on the functions to be achieved by jacket layer 46.

[Method for Manufacturing Coaxial Cable]

The coaxial cable 40 is formed by covering the insulated electric wire 1 with outer conductor 45 and jacket layer 46.

Covering with outer conductor 45 can be performed by a known method in accordance with a shielding method to be applied. For example, a braided shield can be formed by inserting insulated electric wire 1 into a tubular braid and then reducing the diameter of the braid. A served shield can be formed, for example, by winding a metal wire, such as copper wire, around insulating layer 3. A tape shield can be formed by winding electrically conductive tape, such as laminated tape of aluminum and polyester, around the periphery of insulating layer 3.

Covering with jacket layer 46 can be performed in a similar manner to covering conductor 2 with insulating layer 3 of the insulated electric wire 1. Also, the thermoplastic resin or the like may be applied to the peripheral surface of insulated electric wire 1 and outer conductor 45.

<Advantage>

As the cable for information transmission comprises the insulated electric wire, an increase in the dielectric dissipation factor of the insulating layer can be suppressed and excellent heat resistance can be achieved. Accordingly, the cable for information transmission enables the durability under a high temperature environment to be improved and transmission losses to be reduced.

OTHER EMBODIMENTS

The embodiment disclosed this time should be considered exemplary in all respects and not limiting. The scope of the present invention is not limited to configurations of the above described embodiment, but is indicated by claims and intended to include all changes within the meaning and scope of equivalence with the claims.

In the insulated electric wire, the insulating layer may be foamed. Foaming the insulating layer enables the composite permittivity to be reduced as well as the weight of the insulated electric wire to be reduced.

The cable for information transmission may be a multicore cable in which a plurality of Twinax cables are further covered by a jacket. Making the cable a multicore cable enables to transmit a larger capacity signal in comparison with a Twinax cable.

Conductors can also be formed of stranded wires obtained by twisting a plurality of metal wires together. In this case, multiple types of metal wires may be combined. The number of twists is generally seven or more.

The insulated electric wire may have a primer layer that is directly layered on a conductor. As this primer layer, one obtained by crosslinking a crosslinkable resin containing no metal hydroxide, such as ethylene, can be preferably used. Providing such a primer layer enables the peeling property of the insulating layer and the conductor from decreasing over time to be prevented, thereby enabling a decrease in the efficiency of the wiring operation to be prevented.

EXAMPLES

The present invention will be described in further detail with reference to the following examples, but the present invention is not limited to the following examples.

[Insulating Layers No. 1 to No. 11]

Polypropylene ("NOVATEC EA9" manufactured by Japan Polypropylene Corporation: homopolymer based on polypropylene), as a main component olefinic resin, and a metal deactivator were mixed such that the contents (parts by mass) were as indicated in Table 1 to thereby give a resin composition for an insulating layer. The resin composition for an insulating layer was press-formed to produce insulating layers No. 1 to No. 11 in the form of a sheet. For press-forming conditions, the resin composition was preheated at 180° C. for 5 minutes, then further pressurized at the temperature and maintained for 5 minutes.

N,N'-bis[3-(3,5-di-t-butyl-4-hydroxyphenyl)propionyl] hydrazine represented by the following (K-3) ("Irganox MD1024" manufactured by FUJIFILM Wako Pure Chemical Corporation, melting point: 60° C. to 67° C.) was used as a metal deactivator.

[Formula 5]

(K-3)

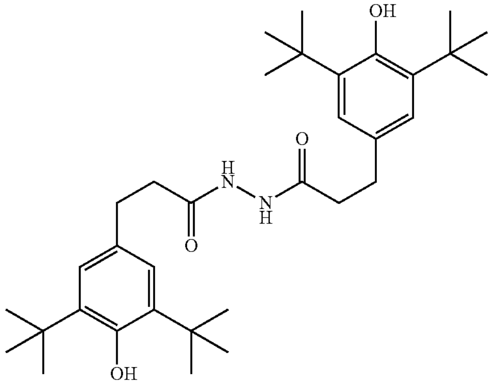

Ethylene bis(oxyethylene)bis[3-(5-tert-butyl-hydroxy-m-tolyl)propionate](Irganox 245 manufactured by BASF Japan Ltd.) was used as a phenolic antioxidant having a semi-hindered phenol structure.

4,4'-Thiobis(3-methyl-6-tert-butyl)phenol (NOCRAC 300 manufactured by Ouchi Shinko Chemical Industrial Co., Ltd.) was used as a phenolic antioxidant having a less-hindered phenol structure.

(Measurement of Dielectric Dissipation Factor and Relative Permittivity)

The dielectric dissipation factor and relative permittivity of the obtained specimens in the sheet form in the case of application of a high frequency electric field having a frequency of 10 GHz were measured in accordance with a method according to JIS-R1641 (2007). The measurement was performed three times, and the average value was calculated.

(Heat Resistance Aging Test)

The insulating layers No. 1 to No. 11 were subjected to a heat resistance aging test in accordance with JASO D611 standard in the following procedure.

Each of the sheets was punched into a dumbbell shape (JIS No. 3), and the specimens were placed in thermostatic chambers set to 160° C., 180° C., and 200° C. The time taken for the tensile elongation to fall below 100% was determined and taken as the life. An Arrhenius plot was made based on the results, and the temperature at which the tensile elongation reached 100% in 10000 hours of the aging test was estimated and taken as the 10000-hour heat resistant temperature. One having a heat resistant temperature of 125° C. or more was passed.

The results of the dielectric dissipation factor and relative permittivity measurement and the heat resistance aging test are shown in Table 1.

TABLE 1

| | 1 | 2 | 3 | 4 | 5 | 6 | 7 | 8 | 9 | 10 | 11 |
|---|---|---|---|---|---|---|---|---|---|---|---|
| Polypropylene NOVATEC EA9 (parts by mass) | 100 | 100 | 100 | 100 | 100 | 100 | 100 | 100 | 100 | 100 | 100 |
| Copper deactivator Irganox MD1024 (parts by mass) | 0.02 | 0.02 | 0.02 | 0.02 | 0.02 | 0.02 | 0.02 | 0.02 | 0.02 | 0.02 | 0.02 |
| Semi-hindered phenol Irganox 245 (parts by mass) | 0.3 | 0.9 | — | — | 0.3 | 0.9 | — | — | — | 0.2 | 2 |
| Less-hindered phenol NOCRAC 300 (parts by mass) | — | — | 1 | 3.8 | — | — | — | 1 | — | — | — |
| Hindered phenol Irganox 1076 (parts by mass) | — | — | — | — | — | — | 1 | — | — | — | — |
| Sulfur-based antioxidant SANCELER M (parts by mass) | 0.9 | 0.3 | 3.8 | 1 | — | — | 3.8 | — | 1 | 0.6 | 4 |
| Sulfur-based antioxidant SEENOX DL (parts by mass) | — | — | — | — | 0.9 | 0.3 | — | — | — | — | — |
| Antioxidant content (parts by mass) | 1.2 | 1.2 | 4.8 | 4.8 | 1.2 | 1.2 | 4.8 | 1 | 1 | 0.8 | 6 |
| Mass ratio of phenolic antioxidant to sulfur-based antioxidant | 1:3 | 3:1 | 1:3.8 | 3.8:1 | 1:3 | 3:1 | 1:3.8 | 1:0 | 0:1 | 1:3 | 1:2 |
| Electrical characteristics Dielectric dissipation factor ($\times 10^{-4}$) n = 1 | 1.72 | 1.65 | 3.78 | 3.82 | 1.89 | 1.94 | 4.20 | 1.98 | 2.05 | 1.65 | 4.30 |
| n = 2 | 1.68 | 1.70 | 3.85 | 3.80 | 1.95 | 1.90 | 4.15 | 2.00 | 2.12 | 1.59 | 4.15 |
| n = 3 | 1.81 | 1.69 | 3.94 | 3.75 | 1.99 | 1.91 | 4.20 | 2.01 | 2.03 | 1.55 | 4.23 |
| Average | 1.74 | 1.68 | 3.86 | 3.79 | 1.94 | 1.92 | 4.18 | 2.00 | 2.07 | 1.60 | 4.23 |
| Relative permittivity n = 1 | 2.23 | 2.23 | 2.23 | 2.23 | 2.23 | 2.20 | 2.26 | 2.20 | 2.25 | 2.20 | 2.24 |
| n = 2 | 2.21 | 2.21 | 2.21 | 2.24 | 2.18 | 2.20 | 2.21 | 2.23 | 2.20 | 2.21 | 2.27 |
| n = 3 | 2.18 | 2.18 | 2.25 | 2.21 | 2.21 | 2.23 | 2.22 | 2.21 | 2.20 | 2.18 | 2.21 |
| Average | 2.21 | 2.21 | 2.23 | 2.23 | 2.21 | 2.21 | 2.23 | 2.21 | 2.22 | 2.20 | 2.24 |
| Heat resistance aging test 10000-hour heat resistance temperature (° C.) | 126 | 127 | 130 | 132 | 127 | 127 | 134 | 119 | 102 | 118 | 132 |

2-Mercaptobenzothiazole (SANCELER M manufactured by SANSHIN CHEMICAL INDUSTRY CO., LTD.) and didodecylthiodipropionate (SEENOX DL manufactured by SHIPRO KASEI KAISHA, LTD.) were used as sulfur-based antioxidants.

<Evaluation>

The insulating layers No. 1 to No. 11 obtained as described above were subjected to measurement of the dielectric dissipation factor and relative permittivity and to heat resistant aging test.

From the results in Table 1 above, in respect with the insulating layers No. 1 to No. 7, in which the insulating layer contains an antioxidant including a phenolic antioxidant and a sulfur-based antioxidant except for a sulfur-containing phenolic antioxidant and in which the total content of the antioxidant is more than 1.0 part by mass and 5.0 parts by mass or less per 100 parts by mass of the olefinic resin, the dielectric dissipation factor was suppressed to $4.20\times10^{-4}$ or less, and the 10000-hour heat resistance temperature in the heat resistance aging test was 125° C. or more. The insulating layers No. 1 to No. 6, in which the phenolic antioxidant has a less-hindered phenol structure or semi-hindered phenol structure, had a more satisfactory effect of reducing the dielectric dissipation factor.

In contrast, the insulating layers No. 8 to No. 11, in which the content of the antioxidant is 1.0 part by mass or less or more than 5.0 parts by mass per 100 parts by mass of the olefinic resin, the dielectric dissipation factor was a value as high as exceeding $4.20\times10^{-4}$, or the 10000-hour heat resistance temperature was inferior.

From the above description, it can be seen that the insulated electric wire suppresses an increase in the dielectric dissipation factor of the insulating layer and is also excellent in heat resistance.

REFERENCE SIGNS LIST

1, **1*a*, 1*b* insulated electric wire; 2, 2*a*, 2*b* conductor; 3, 3*a*, 3*b* insulating layer; 5 drain wire; 10 Twinax cable; 30 shield tape; 40 coaxial cable; 45 outer conductor; 46** jacket layer

The invention claimed is:

1. At least one linear conductor; and

An insulated electric wire comprising:

at least one insulating layer layered on an outer peripheral surface of the conductor, wherein the insulating layer contains an olefinic resin and an antioxidant, wherein the olefinic resin is polypropylene, a content of the antioxidant is more than 1.0 part by mass and 5.0 parts by mass or less per 100 parts by mass of the olefinic resin, and the antioxidant comprises a phenolic antioxidant and a sulfur-based antioxidant except for a sulfur-containing phenolic antioxidant, wherein the phenolic antioxidant consists of one of either a semi-hindered phenol structure represented by the following formula (1) or a less-hindered phenol structure represented by the following formula (2):

(1)

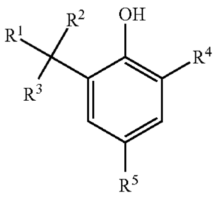

-continued (2)

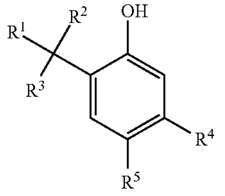

wherein $R^1$ to $R^4$ are methyl groups, and $R^5$ is a substituent, and wherein the sulfur-based antioxidant is represented by the following formula (3) or the following formula (4) or is pentaerythritol tetrakis-(3-dodecylthiopropionate):

(3)

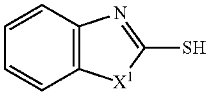

(4)

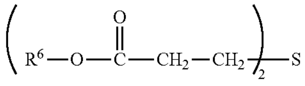

wherein $X^1$ is —S— or —NH—, and $R^6$ is an alkyl group having 12 to 18 carbon atoms.

2. The insulated electric wire according to claim 1, wherein a mass ratio of the phenolic antioxidant to the sulfur-based antioxidant is from 4:1 to 1:4.

3. The insulated electric wire according to claim 1, wherein the insulating layer further contains a metal deactivator.

4. The insulated electric wire according to claim 1, wherein a dielectric dissipation factor of the insulating layer in the case of application of a high frequency electric field having a frequency of 10 GHz is $4.2\times10^{-4}$ or less.

5. A cable for information transmission comprising one or more of the insulated electric wires according to claim 1.

* * * * *